March 14, 1944.  J. C. COEN  2,344,341
SPEED CHANGING DEVICE
Filed Nov. 18, 1941  2 Sheets-Sheet 1
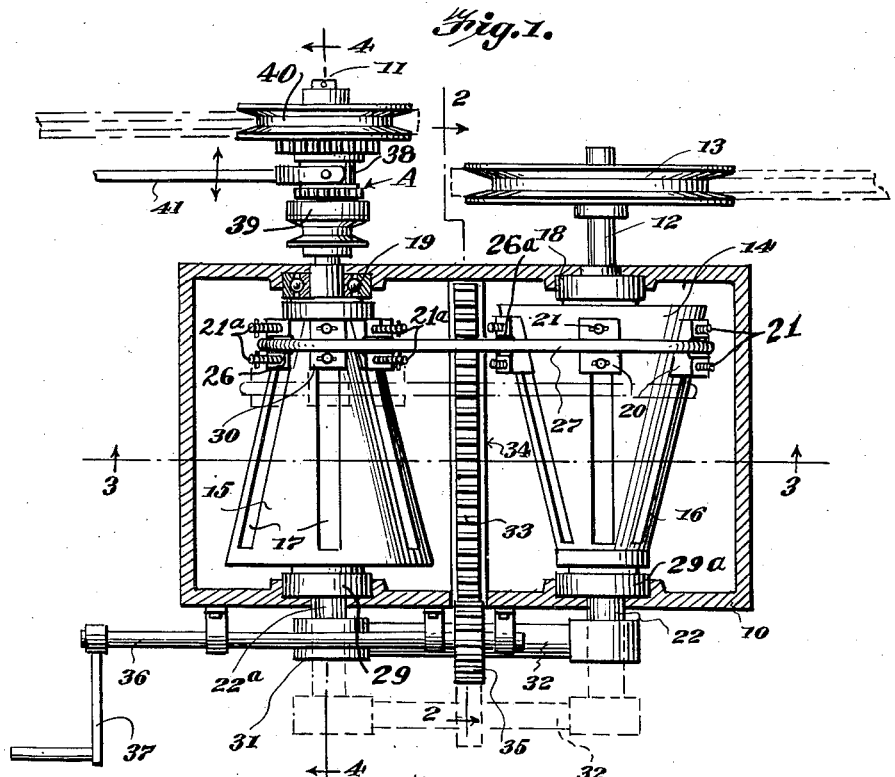
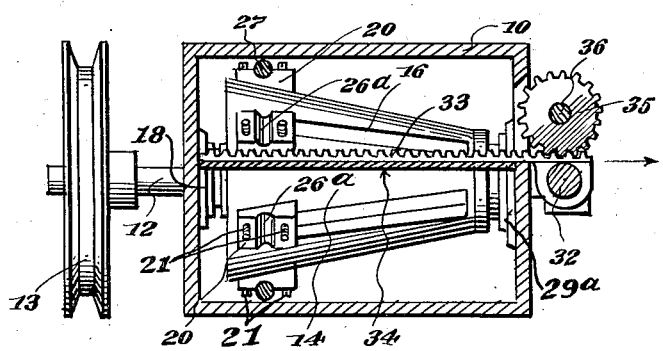
Inventor
JOSEPH C. COEN March 14, 1944. J. C. COEN 2,344,341
SPEED CHANGING DEVICE
Filed Nov. 18, 1941 2 Sheets-Sheet 2

Inventor
JOSEPH C. COEN

By *Irving P. McCathran*
Attorney

Patented Mar. 14, 1944

2,344,341

UNITED STATES PATENT OFFICE 2,344,341

SPEED CHANGING DEVICE

Joseph C. Coen, Pomona, Calif., assignor of one-third to Victor Gutzwiller and one-third to Cecil Jane Coen, both of San Bernardino, and one-third to Ethel B. Williams and Kenneth R. Williams, both of Pomona, Calif.

Application November 18, 1941, Serial No. 419,630

2 Claims. (Cl. 74—230.21)

This invention relates to a speed changing device, and has for one of its objects the production of a simple and efficient means for facilitating the changing of speed by shifting the position of the driving belt upon the driven and driving elements.

A further object of this invention is the production of a simple and efficient speed changing device embodying shiftable and expansible driving and driven elements which may be easily operated to increase or decrease the speed of the driven element.

Other objects and advantages of the present invention will appear throughout the following specification and claims.

In the drawings:

Figure 1 is a longitudinal sectional view through the supporting casing showing the operating mechanism in elevation;

Figure 2 is a sectional view taken on line 2—2 of Figure 1;

Figure 3:
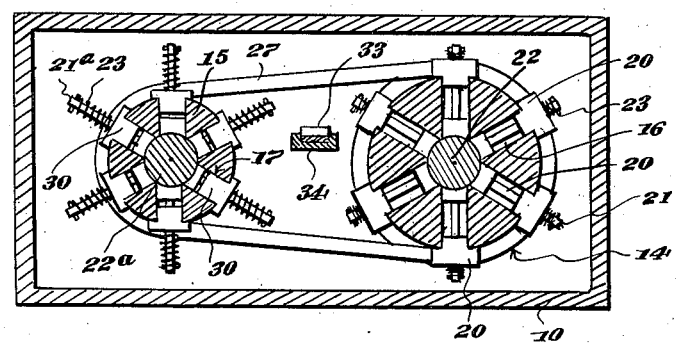
Figure 3 is a sectional view taken on line 3—3 of Figure 1.

By referring to the drawings, it will be seen that 10 designates the casing of any desired type carrying a driven shaft 11 and a parallel driving shaft 12. A power pulley 13 is carried by the driving shaft 12. The driving shaft 12 carries a cone-shaped guide 14 fixed to rotate therewith, and the driven shaft 11 carries an oppositely extending cone-shaped guide 15 fixed to rotate with the driven shaft 11. The cone-shaped guide 14 is provided with longitudinally extending slots 16, and the guide 15 is provided with longitudinal slots 17, the guides 14 and 15 tapering in opposite directions, and the slots 16 and 17 also tapering in opposite directions in conformity with the shape of the cones 14 and 15. The cone-shaped guides 14 and 15 are similarly constructed, but taper in opposite directions as shown in Figure 1. A bearing 18 supports one end of the shaft 12, and a bearing 19 supports one end of the shaft 11.

A pulley block 20 is slidably mounted in each slot 16 of the guide 14 and a pulley block 30 is slidably mounted in each slot 17 of the guide 15. The pulley blocks 20 are constructed similarly to the blocks 30. As shown in detail in Figure 5, which illustrates one of the blocks 30, it will be seen that this block 30 slides in one of the slots 17 and is provided with overhanging flanges 24. These flanges 24 overhang the sides of the slots 17 of the cone-shaped guide 15. Pins 21a carry springs 23 to yieldably and frictionally hold the overhanging flanges 24 of the blocks 30 in overhanging engagement with the sides of these slots 17. The yoke shaft 22a is provided with lugs 25 at its inner end to fit in the slots 17 and key the guide 15 thereon, and at the same time allow the shaft 22a to move longitudinally.

Figure 5:
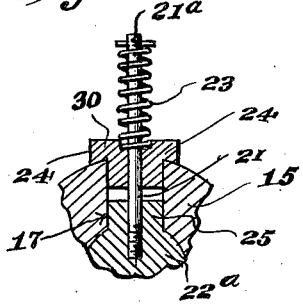
Figure 5 is a sectional view taken on line 5—5 of Figure 4.
Figure 6:
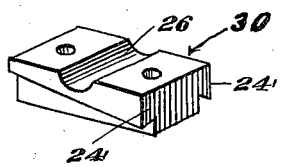
Figure 6 is a perspective view of one of the pulley blocks.

The flanges 24 are preferably undercut, as shown in Figure 5 to fit snugly upon and conform to the contour of the cone-shaped guide 15, which is preferably circular in cross section. Each pulley block 30 is provided with a transverse channel 26 for receiving the belt 27, and the channels 26 of the blocks 30 are always in alignment with similar channels 26a of the blocks 20 since the blocks 20 and 30 are anchored for longitudinal movement with the yoke shaft 22. The outer end 28 of the cone-shaped guide 15 is slidably mounted upon this yoke shaft 22a, and the shaft 22a is journaled for rotatable and slidable movement in the bearing 29 carried by the casing 10.

Figure 4:
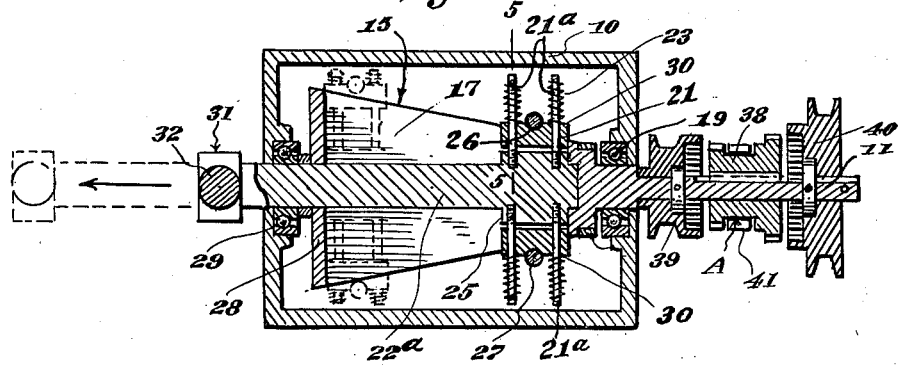
Figure 4 is a sectional view taken on line 4—4 of Figure 1.

The driven shaft 11 is journaled within a bearing 19 and is integral with or fixed to the cone-shaped guide 15, but the shaft 22a is slidable through the guide 15 and bearing 29, as shown in Figure 4. The guide 14 is journaled within a bearing 18 and is integral with or fixed to the driving shaft 12, and a yoke shaft 22 which carries the blocks 20 is slidable through the guide 14 and bearing 29a. The blocks 30 are provided with channels 26 and the blocks 20 are provided with similar channels 26a for receiving a belt 27 which passes over the blocks 20 and 30 to provide driving motion between the driving and driven shafts. The blocks 20 are anchored upon the yoke shaft 22 by pins 21 similar to the pins 21a above described, and the blacks 20 are mounted and constructed in the same manner as the blocks 30 illustrated in detail in Figure 5.

The yoke shafts 22 and 22a are rotatably mounted at their outer ends in the journals 31 of a shifting yoke 32. These shafts 22 and 22a are anchored upon the shifting yoke 32 and move longitudinally as the shifting yoke 32 is moved toward or away from the casing 10, as shown in dotted lines in Figure 1. A rack bar 33 is slidably mounted upon a track 34 carried by the casing 10, and this rack bar 33 is engaged by a pinion 35 which in turn is secured to a shaft 36 for shifting the yoke shafts 22 and 22a to a selected adjusted position as the crank 37 is operated.

Should a slower speed be desired than may be possible by the apparatus above described, the shifting device A may be utilized, and this shifting device A comprises a slidable thimble 38 which is keyed to the driven shaft 11, and which may be shifted longitudinally of the shaft 11 for selective clutching engagement with the the pulley 39 or the pulley 40. The pulleys 39 and 40 rotate freely on the shaft 11, whereas the shifting thimble 38 is keyed to the shaft to rotate therewith and to impart rotary movement selectively to the pulleys 39 and 40 when the thimble 38 is moved into clutching engagement therewith. An actuating lever 41 is connected to the thimble 38 to facilitate the shifting of the thimble 38.

From the foregoing description it will be seen that a very simple and efficient speed changing device has been provided, consisting of a pair of substantially parallel oppositely extending cone-like guides, upon which guides are slidably mounted a plurality of pulley blocks. These pulley blocks are in turn connected to and anchored upon the yoke shafts 22 and 22ª so that the blocks may be moved longitudinally of the slots which are formed in the oppositely extending cone-shaped guides to decrease the size of the driving pulley formed upon the blocks 20 and increase the size of the driven pulley formed by the blocks 30 as the shifting yoke 32 is pulled outwardly. As the yoke 32 is moved inwardly to the full line position shown in Figure 1, the size of the pulley formed by the blocks 30 will be decreased and the size of the pulley formed by the blocks 20 will be increased. By means of this structure, a simple and efficient device is provided for varying the speed of the driven with respect to the driving shaft, merely by actuating the crank 37 to shift the position of the pulley blocks 20 and 30 upon the respective cone-like guides 14 and 15.

It should be understood that the yoke 32 may be properly adjusted upon the yoke shafts 22 and 22ª when originally assembling the device, and the blocks 20 and 30 may also be properly secured to insure the tightening of the belt 27.

Certain detail changes in the construction may be employed without departing from the spirit of the invention, so long as such changes fall within the scope of the appended claims.

What is claimed as new is:

1. A speed changing device of the class described comprising a support, a pair of parallel cone-like guides carried by the support, a driving shaft connected to one guide, a driven shaft connected to the other guide, a yoke shaft slidably mounted through each guide, a shifting yoke connected to each yoke shaft, each yoke shaft being mounted for rotatable movement in engagement with the yoke, each cone-like guide having a plurality of longitudinally extending and converging slots, pulley blocks anchored upon the yoke shafts and movable longitudinally of the slots, a flexible driving element passing around the pulley blocks of one guide and also passing around the pulley blocks of the adjoining guide for transmitting power from one guide to the adjoining guide, the blocks being shiftable as to position upon the guides to vary the speed of the driven shaft with respect to the speed of the driving shaft, each pulley block comprising a slidable element, anchoring pins secured to the yoke shafts and slidable through the pulley blocks, and spring means engaging the blocks for yieldably holding the pulley blocks in slidable engagement with the guides.

2. A speed changing device of the class described comprising a support, a pair of parallel cone-like guides carried by the support, a driving shaft connected to one guide, a driven shaft connected to the other guide, a yoke shaft slidably mounted through each guide, a shifting yoke connected to each yoke shaft, each yoke shaft being mounted for rotatable movement in engagement with the yoke, each cone-like guide having a plurality of longitudinally extending and converging slots, pulley blocks anchored upon the yoke shafts and movable longitudinally of the slots, a flexible driving element passing around the pulley blocks of one guide and also passing around the pulley blocks of the adjoining guide for transmitting power from one guide to the adjoining guide, the blocks being shiftable as to position upon the guides to vary the speed of the driven shaft with respect to the speed of the driving shaft, each pulley block comprising a slidable element, anchoring pins secured directly to the yoke shafts and slidable through the pulley blocks, means directly engaging the pulley blocks for yieldably holding the pulley blocks in slidable engagement with the guides, and said pulley blocks having overhanging side flanges for overhanging the sides edges of the slots formed in the guides.

JOSEPH. C. COEN.